Patented May 31, 1938

2,118,829

UNITED STATES PATENT OFFICE 2,118,829

PREPARATION OF COBALT-COPPER CATALYSTS

Henry H. Storch, Pittsburgh, Pa., assignor to Government of the United States, as represented by the Secretary of the Interior No Drawing. Application March 31, 1937, Serial No. 134,091

5 Claims. (Cl. 23—234)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the oxidation of the carbon monoxide in water gas to carbon dioxide by steam; and has for its object the preparation of a cobalt-copper catalyst for this and similar reactions which will give high activity for extended periods, and which is in the mechanically desirable form of hard, porous granules.

Cobalt catalysts containing small amounts of copper are known to be very active at 300° to 325° C. in catalyzing the water gas shift reaction namely:

$$CO + H_2O = CO_2 + H_2$$

The methods of preparation of such a catalyst thus far described in the literature involve fusion of the metal oxides in an oxy-hydrogen flame or co-precipitation as hydrated oxides from aqueous solutions of the nitrates. The former is an expensive method for practical work, and the latter does not readily yield mechanically stable granules.

I have found that if a mixture of cobalt carbonate with small amounts, for example, between 5 percent and 25 percent, of copper oxide is rapidly heated within three minutes or less from room temperature to a temperature between 900° and 1100° C. a sintered, pumice-like mass of granules is obtained. This product has excellent mechanical properties which permit prolonged use without appreciable spalling. It is also a very active catalyst when properly reduced and subsequently protected from poisoning, particularly poisoning with sulfur or sulfur compounds.

An example of the activity of this catalyst in practical use is as follows:

Water gas was made by the reaction of Pittsburgh natural gas and steam. This gas contained about 72 percent $H_2$, 21 percent CO, 3 percent $CO_2$, 2.5 percent $N_2$, 1 percent $CH_4$ and 0.5 percent $O_2$. This gas was mixed with four volumes of steam and passed through 8 mesh granules of the cobalt-copper catalyst prepared as described above, at 310° C. and at a space velocity per hour of 3000 of dry water gas or a space velocity per hour of 15,000 of the water gas-steam mixture. The carbon monoxide content of the off-gas was 0.2 percent and the methane content about 2 percent, during a period of 100 hours operation.

I have further found that when for any reason the catalyst should become poisoned, as for example, by impurities introduced by the steam; a very simple procedure will restore its original activity. This regeneration is accomplished by passing a slow stream of air over the catalyst, whose temperature is maintained at 900°-1100° C., for a period of about thirty minutes. Upon subsequent reduction and use with water gas-steam mixture, the catalyst showed an activity identical with that of the original catalyst.

Slower heating of the cobalt carbonate—copper oxide mixture, during the preparation of the catalyst, yields a powder which is not suitable for the rapid gas flow demanded by a space velocity per hour of 15,000 for the water gas-steam mixture. The probable explanation of the difference in mechanical properties of the catalyst when prepared by slow as compared with rapid heating of the cobalt carbonate—copper oxide mixture, is as follows:

The formation of intermediate compounds which may be represented by the formula  $(CoO)_x \cdot (CoCO_3)_y$ results in a sufficiently low melting compound to yield the observed sintering phenomenon; for it is conceivable that such intermediary compounds may decompose below their melting points, and hence rapid heating would result in sintering whereas a slow rate of heating may give ample time for complete decomposition to occur before the melting point is reached.

Suitable precautions are taken to avoid sintering of the catalyst during reduction. Such precautions preferably are taken by so conducting the reduction that sintering temperature cannot occur. In the preferred practice of my invention to prevent large uncontrollable increases in temperature during reduction it is usually desirable to dilute the reducing gas with nitrogen or other inert gas. For example: a satisfactory mixture would be 5 volumes of hydrogen or of water gas plus 95 volumes of nitrogen. This reducing mixture is passed over the granules of catalyst preferably contained in a copper lined vessel, and heated to not over 500° C. and preferably to about 200–300° C.

During reduction the gray color of the unreduced granules changes to a "copper" color, and the mechanical properties of the granules are essentially the same as those of the unreduced material. After poisoning occurs the regeneration of the spent catalyst by oxidation and reduction, results in a considerable decrease in mechanical stability of the catalyst. It is therefore desirable to avoid poisoning by the introduction of a purifying system. The latter may consist of lead chromate deposited on pumice, active charcoal, copper turnings kept at 500° C., etc.

I claim:

1. A method for the preparation of cobalt-copper catalysts which comprises heating up mixtures of cobalt carbonate and copper oxide, at a rapid rate, that is, about 350° C. per minute to a temperature between 900° and 1100° C.

2. A method for the preparation of cobalt-copper catalysts which comprises heating up mixtures of cobalt carbonate and copper oxide, at a rapid rate, that is, about 350° C. per minute to a temperature between 900° and 1100° C.; and subsequently reducing the resulting mixtures of oxides with reducing gases.

3. A method for the regeneration of poisoned cobalt-copper catalysts prepared as described in claim 2 which comprises heating these at a temperature between 900° and 1100° C. in a slow stream of an oxidizing gas for a period of time sufficient (usually about thirty minutes) to remove the poisons; and subsequently reducing the resulting mixtures of oxides with reducing gases.

4. The improved catalyst obtained by quick-heating a mixture of cobalt carbonate in major amount and copper oxide in minor amount by the method of claim 2, said catalyst being in the form of a sintered, pumice-like mass of granules, capable of being reduced by reducing gases, capable of prolonged use without appreciable spalling, and capable of being rapidly regenerated, when poisoned, by heating to between 900° and 1100° C. in a slow stream of an oxidizing gas, substantially as described.

5. The improved catalyst obtained by quick-heating and reduction of a mixture of cobalt carbonate in major amount and copper oxide in minor amount by the method of claim 3, said catalyst being in the form of a sintered pumice-like mass of granules, capable of prolonged use without appreciable spalling, catalytically very active at a temperature near 310° C., and capable of being regenerated, when poisoned, by oxidation at a temperature of about 900° to 1100° C. followed by reduction.

HENRY H. STORCH

CERTIFICATE OF CORRECTION.

Patent No. 2,118,829.    May 31, 1938.

HENRY H. STORCH.

It is hereby certified that error appears in the printed specification of the above numbered patent requiring correction as follows: Page 2, first column, line 18, claim 3, and second column, line 4, claim 4, for the claim reference numeral "2" read 1; and line 15, claim 5, for "3" read 2, and that the said Letters Patent should be read with these corrections therein that the same may conform to the record of the case in the Patent Office.

Signed and sealed this 5th day of July, A.D. 1938.

(Seal)

Henry Van Arsdale,
Acting Commissioner of Patents.

sist of lead chromate deposited on pumice, active charcoal, copper turnings kept at 500° C., etc.

I claim:

1. A method for the preparation of cobalt-copper catalysts which comprises heating up mixtures of cobalt carbonate and copper oxide, at a rapid rate, that is, about 350° C. per minute to a temperature between 900° and 1100° C.

2. A method for the preparation of cobalt-copper catalysts which comprises heating up mixtures of cobalt carbonate and copper oxide, at a rapid rate, that is, about 350° C. per minute to a temperature between 900° and 1100° C.; and subsequently reducing the resulting mixtures of oxides with reducing gases.

3. A method for the regeneration of poisoned cobalt-copper catalysts prepared as described in claim 2 which comprises heating these at a temperature between 900° and 1100° C. in a slow stream of an oxidizing gas for a period of time sufficient (usually about thirty minutes) to remove the poisons; and subsequently reducing the resulting mixtures of oxides with reducing gases.

4. The improved catalyst obtained by quick-heating a mixture of cobalt carbonate in major amount and copper oxide in minor amount by the method of claim 2, said catalyst being in the form of a sintered, pumice-like mass of granules, capable of being reduced by reducing gases, capable of prolonged use without appreciable spalling, and capable of being rapidly regenerated, when poisoned, by heating to between 900° and 1100° C. in a slow stream of an oxidizing gas, substantially as described.

5. The improved catalyst obtained by quick-heating and reduction of a mixture of cobalt carbonate in major amount and copper oxide in minor amount by the method of claim 3, said catalyst being in the form of a sintered pumice-like mass of granules, capable of prolonged use without appreciable spalling, catalytically very active at a temperature near 310° C., and capable of being regenerated, when poisoned, by oxidation at a temperature of about 900° to 1100° C. followed by reduction.

HENRY H. STORCH

---

CERTIFICATE OF CORRECTION.

Patent No. 2,118,829. May 31, 1938.

HENRY H. STORCH.

It is hereby certified that error appears in the printed specification of the above numbered patent requiring correction as follows: Page 2, first column, line 18, claim 3, and second column, line 4, claim 4, for the claim reference numeral "2" read 1; and line 15, claim 5, for "3" read 2, and that the said Letters Patent should be read with these corrections therein that the same may conform to the record of the case in the Patent Office.

Signed and sealed this 5th day of July, A.D. 1938.

(Seal)

Henry Van Arsdale,
Acting Commissioner of Patents.

CERTIFICATE OF CORRECTION.

Patent No. 2,118,829.  May 31, 1938.

HENRY H. STORCH.

It is hereby certified that error appears in the printed specification of the above numbered patent requiring correction as follows: Page 2, first column, line 18, claim 3, and second column, line 4, claim 4, for the claim reference numeral "2" read 1; and line 15, claim 5, for "3" read 2, and that the said Letters Patent should be read with these corrections therein that the same may conform to the record of the case in the Patent Office.

Signed and sealed this 5th day of July, A.D. 1938.

(Seal)

Henry Van Arsdale,
Acting Commissioner of Patents.